(12) United States Patent
Yermakov et al.

(10) Patent No.: US 9,489,515 B2
(45) Date of Patent: Nov. 8, 2016

(54) SYSTEM AND METHOD FOR BLOCKING THE TRANSMISSION OF SENSITIVE DATA USING DYNAMIC DATA TAINTING

(75) Inventors: Alexander Yermakov, Ashkelon (IL); Mark Kaplan, Modiin (IL)

(73) Assignee: TRUSTWAVE HOLDINGS, INC., Chicago, IL (US)

( * ) Notice: Subject to any disclaimer, the term of this patent is extended or adjusted under 35 U.S.C. 154(b) by 788 days.

(21) Appl. No.: 13/156,952

(22) Filed: Jun. 9, 2011

(65) Prior Publication Data

US 2011/0307951 A1   Dec. 15, 2011

Related U.S. Application Data

(60) Provisional application No. 61/353,957, filed on Jun. 11, 2010.

(51) Int. Cl.
*G06F 21/56*    (2013.01)
*G06F 17/22*    (2006.01)
(Continued)

(52) U.S. Cl.
CPC .......... *G06F 21/563* (2013.01); *G06F 17/227* (2013.01); *G06F 21/56* (2013.01); *H04L 63/0227* (2013.01); *G06F 21/554* (2013.01);
(Continued)

(58) Field of Classification Search
CPC .... G06F 21/554; G06F 17/227; G06F 21/56; G06F 21/563; H04L 63/0227; H04L 63/168; H04L 63/1408
USPC ................................ 713/164; 726/26, 27, 30
See application file for complete search history.

(56) References Cited

U.S. PATENT DOCUMENTS 6,092,194 A    7/2000    Touboul
6,154,844 A    11/2000   Touboul et al.
(Continued)

FOREIGN PATENT DOCUMENTS

CA    2578792    3/2006
EP    0965094    12/1999
(Continued)

OTHER PUBLICATIONS

United States Patent and Trademark Office, "Non-Final Office Action," issued in connection with U.S. Appl. No. 13/155,179, Mar. 29, 2013, 32 pages.
(Continued)

*Primary Examiner* — Kaveh Abrishamkar
*Assistant Examiner* — Thomas Ho
(74) *Attorney, Agent, or Firm* — Hanley, Flight and Zimmerman, LLC.

(57) ABSTRACT

Blocking transmission of tainted data using dynamic data tainting is described. For example, sensitive information is stored on a client device as tainted data. The client device generates a data request for retrieving data from a non-trusted entity via a network. A gateway is communicatively coupled to the client device and the network. The gateway receives computer code from the non-trusted entity via the network. The gateway executes the computer code. The gateway tracks the execution of the computer code to determine whether the computer code attempts to access tainted data and transmit the tainted data to an outside entity. The gateway blocks the transmission of the tainted data to the outside entity responsive to determining that the computer code has attempted to access tainted data and transmit the tainted data to an outside entity.

20 Claims, 8 Drawing Sheets

(51) Int. Cl.
  *H04L 29/06* (2006.01)
  *G06F 21/55* (2013.01)
(52) U.S. Cl.
  CPC .......... *H04L 63/1408* (2013.01); *H04L 63/168* (2013.01)

(56) References Cited

U.S. PATENT DOCUMENTS

| | | | |
|---|---|---|---|
| 6,804,780 B1 | 10/2004 | Touboul | |
| 7,284,274 B1 | 10/2007 | Walls et al. | |
| 7,392,541 B2 | 6/2008 | Largman et al. | |
| 7,613,926 B2 | 11/2009 | Edery et al. | |
| 7,624,449 B1 | 11/2009 | Perriot | |
| 7,647,633 B2 | 1/2010 | Edery et al. | |
| 7,721,333 B2* | 5/2010 | Horne | 726/22 |
| 7,823,201 B1* | 10/2010 | Xu | 726/22 |
| 7,849,509 B2 | 12/2010 | Venkatapathy et al. | |
| 8,074,281 B2* | 12/2011 | Peinado et al. | 726/24 |
| 8,079,086 B1 | 12/2011 | Edery et al. | |
| 8,117,531 B1 | 2/2012 | Lueck | |
| 8,225,408 B2 | 7/2012 | Rubin et al. | |
| 8,407,790 B2 | 3/2013 | Mony | |
| 8,464,341 B2* | 6/2013 | Cohen | 726/22 |
| 2002/0095660 A1 | 7/2002 | O'Brien et al. | |
| 2003/0056199 A1 | 3/2003 | Li et al. | |
| 2003/0084063 A1 | 5/2003 | DelMonaco et al. | |
| 2004/0078784 A1 | 4/2004 | Bates et al. | |
| 2005/0108554 A1 | 5/2005 | Rubin et al. | |
| 2005/0193380 A1 | 9/2005 | Vitanov et al. | |
| 2005/0289358 A1* | 12/2005 | Haselden et al. | 713/187 |
| 2006/0190606 A1 | 8/2006 | Kohavi | |
| 2006/0282890 A1* | 12/2006 | Gruper | G06F 21/554 726/22 |
| 2007/0113282 A1 | 5/2007 | Ross | |
| 2007/0143851 A1 | 6/2007 | Nicodemus et al. | |
| 2007/0174915 A1* | 7/2007 | Gribble | G06F 21/53 726/24 |
| 2007/0250930 A1 | 10/2007 | Aziz et al. | |
| 2007/0277163 A1 | 11/2007 | Avresky | |
| 2008/0016339 A1* | 1/2008 | Shukla | 713/164 |
| 2008/0189086 A1 | 8/2008 | Ford et al. | |
| 2008/0216175 A1 | 9/2008 | Pike | |
| 2008/0263358 A1* | 10/2008 | Alme | H04L 63/14 713/176 |
| 2008/0263659 A1* | 10/2008 | Alme | 726/22 |
| 2008/0301796 A1 | 12/2008 | Holostov et al. | |
| 2009/0019545 A1 | 1/2009 | Ben-Itzhak et al. | |
| 2009/0031423 A1* | 1/2009 | Liu et al. | 726/24 |
| 2009/0077091 A1 | 3/2009 | Khen et al. | |
| 2009/0282480 A1 | 11/2009 | Lee et al. | |
| 2009/0328210 A1* | 12/2009 | Khachaturov et al. | 726/22 |
| 2011/0093773 A1 | 4/2011 | Yee | |
| 2011/0179347 A1 | 7/2011 | Proctor et al. | |
| 2011/0307954 A1 | 12/2011 | Melnik et al. | |
| 2011/0307955 A1 | 12/2011 | Kaplan et al. | |
| 2011/0307956 A1 | 12/2011 | Yermakov et al. | |
| 2012/0117651 A1 | 5/2012 | Edery et al. | |

FOREIGN PATENT DOCUMENTS

| | | |
|---|---|---|
| EP | 1810152 | 7/2007 |
| WO | 9821683 | 5/1998 |
| WO | 9935583 | 7/1999 |
| WO | 2006025050 | 3/2006 |

OTHER PUBLICATIONS

United States Patent and Trademark Office, "Non-Final Office Action," issued in connection with U.S. Appl. No. 13/158,106, Feb. 14, 2013, 21 pages.

Patent Cooperation Treaty, "International Preliminary Report on Patentability," issued in connection with Application No. PCT/US2011/039869, Dec. 27, 2012, 5 pages.

Patent Cooperation Treaty, "International Preliminary Report on Patentability," issued in connection with Application No. PCT/US2011/040040, Dec. 27, 2012, 7 pages.

Patent Cooperation Treaty, "International Preliminary Report on Patentability," issued in connection with Application No. PCT/US2011/039927, Dec. 27, 2012, 6 pages.

AdSafe, Making JavaScript Safe for Advertising, http://www.adsafe.org, retrieved Sep. 20, 2011, 4 pgs.

Code Coverage Meter, http://www.coveragemeter.com/codecoverage.html, retrieved Feb. 13, 2012, 11 pgs.

Erickson, MashupOS: Can You Have Security and Web 2.0?, Dr. Dobb's Bloggers, Apr. 23, 2008, 4 pgs.

FBJS (Facebook JavaScript)—Facebook Developers, http://www.developers.facebook.com/docs/fbjs, retrieved Feb. 13, 2012, 17 pgs.

Google-caja, http://code.google.com/p/google-caja/, retrieved Sep. 20, 2011, 6 pgs.

Grune et al., Modern Compiler Design, First Edition, VU University Amsterdam, Amsterdam, The Netherlands, John Wiley & Sons, Ltd., 2000, ISBN 0471976970, 753 pgs.

Hayhurst et al., A Practical Tutorial on Modified Condition/Decision Coverage, NASA/TM-2001-210876, National Aeronautics and Space Administration, Langley Research Center, Hampton, VA, May 2001, 85 pgs.

Ho et al., Practical Taint-Based Protection using Demand Emulation, EuroSys 2006, pp. 29-41.

Howell et al., MashupOS: Operating System Abstractions for Client Mashups, 7 pgs.

International Search Report, International Application No. PCT/US2011/39869, Oct. 13, 2011, 8 pgs.

International Search Report, International Application No. PCT/US2011/39927, Sep. 29, 2011, 7 pgs.

International Search Report, International Application No. PCT/US2011/40040, Oct. 13, 2011, 16 pgs.

JavaScript The Definitive Guide, Chapter 20 JavaScript Security, 20.4 The Data-Tainting Security Model, docstore.mik.ua/orelly/web/jscript/ch20_04.html, retrieved Jan. 13, 2012, 5 pgs.

JSCoverage, Code Coverage for JavaScript, http://siliconforks.com/jscoverage/, retrieved Sep. 2, 2011, 2 pgs.

Livshits et al., Spectator: Detection and Containment of JavaScript Worms, 27 pgs.

Microsoft-Research, Gatekeeper, http://research.microsoft.com/en-us/projects/gatekeeper/, retrieved Sep. 20, 2011, 1 pg.

Microsoft-Research, Nozzle & Zozzle: JavaScript Malware Detection, http://research.microsoft.com/en-us/projects/nozzle/, retrieved Sep. 20, 2011, 2 pgs.

Microsoft WebSandbox Technology Preview, http://websandbox.livelabs.com/, retrieved Sep. 20, 2011, 6 pgs.

Nair et al., A Virtual Machine Based Information Flow Control System for Policy Enforcement, Department of Computer Science, Vrije Universiteit, Amsterdam, The Netherlands, Electronic Notes in Theoretical Computer Science 197, 2008, 14 pgs.

JavaScript Security, Chapter 14 JavaScript Security, http://devedge-temp.mozilla.org/library/manuals/2000/javascript/1.3/guide/sec.html#1021266, retrieved Sep. 20, 2011, 19 pgs.

Perlsec—perldoc.perl.org, retrieved Jan. 13, 2012, 11 pgs.

Reis et al., Usenix, BrowserShield: Vulnerability-Driven Filtering of Dynamic HTML, OSDI '06 Paper, http://www.usenix.org/events/osdi06/tech/full_papers/reis/reis_html/index.html, retrieved Sep. 20, 2011, 24 pgs.

W3C, The World Wide Web Security FAQ, CGI (Server) Scripts, www.w3.org/Security/Faq/wwwsf4.html#CGI-Q15, retrieved Jan. 13, 2012, 17 pgs.

Wang et al., The Multi-Principal OS Construction of the Gazelle Web Browser, MSR Technical Report MSR-TR-2009-16, 20 pgs.

"Blink Total Protection, Multi-Layered Endpoint Protection Platform", 2011, eEye Digital Security, 2 pages.

Gerad M. Davison, "Convert Dynamic to Static Construction", www.refactoring.com/catalog/convertDynamicToStaticConstruction.html, retrieved from the internet on Aug. 9, 2013, 4 pages.

(56) References Cited

OTHER PUBLICATIONS

United States Patent and Trademark Office, "Final Office action", issued in connection with U.S. Appl. No. 13/155,179, mailed on Nov. 13, 2013, 43 pages.

United States Patent and Trademark Office, "Notice of Allowance", issued in connection with U.S. Appl. No. 13/155,179, mailed on Mar. 17, 2014, 48 pages.

United States Patent and Trademark Office, "Non-Final Office action", issued in connection with U.S. Appl. No. 13/156,971, mailed on Mar. 18, 2013, 35 pages.

United States Patent and Trademark Office, "Final Office action", issued in connection with U.S. Appl. No. 13/158,106, mailed on Nov. 29, 2013, 33 pages United States Patent and Trademark Office, "Notice of Allowance", issued in connection with U.S. Appl. No. 13/158,106, mailed on Apr. 3, 2014, 11 pages.

* cited by examiner

SYSTEM AND METHOD FOR BLOCKING THE TRANSMISSION OF SENSITIVE DATA USING DYNAMIC DATA TAINTING

CROSS REFERENCE

This application claims priority from the following U.S. provisional patent application, which is hereby incorporated by reference: Ser. No. 61/353,957, filed on Jun. 11, 2010, and entitled "Method and System for Detecting Malicious Content."

BACKGROUND OF THE INVENTION

1. Field of the Invention

The present invention generally relates to malware detection and in particular to detecting and blocking transmission of sensitive information using dynamic data tainting.

2. Description of the Background Art

Computer networks and systems have become indispensable tools for modern data communication. Terabits of information are communicated by computer networks throughout the world. Much of this information is, to some degree, confidential and its protection is required. However, security threats have become increasingly able to evade conventional signature or pattern based detection techniques. In addition to viruses, additional types of malicious software ("malware"), such as cross-site scripting, have become increasingly common methods for accessing sensitive information.

Cross-site scripting is a type of computer security vulnerability typically found in web applications. The web applications inject client-side scripts into web pages viewed by other users. For example, a client device accesses a website generated by execution of the web application and the web application transmits a client-side script to the client device. When executed by the client device, the client-side script behaves maliciously. For example, the client-side script accesses sensitive information on the client-side and attempts to transmit this sensitive information to a server-side device. Client-side scripting is increasing hard for network security applications and devices to detect with the advent of increased use of dynamic code (e.g., Hypertext Transfer Protocol and JavaScript) in web applications.

SUMMARY OF THE INVENTION

Embodiments of the present invention provide a system and method for blocking transmission of tainted data using dynamic data tainting. For example, sensitive information is stored on a client device as tainted data. The client device generates a data request for retrieving data from a non-trusted entity via a network. A gateway is communicatively coupled to the client device and the network. The gateway receives computer code from the non-trusted entity via the network. The gateway executes the computer code. The gateway tracks the execution of the computer code to determine whether the computer code attempts to access tainted data and transmit the tainted data to an outside entity. The gateway blocks the transmission of the tainted data to the outside entity responsive to determining that the computer code has attempted to access tainted data and transmit the tainted data to an outside entity.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DESCRIPTION OF EMBODIMENTS

Figure 1:
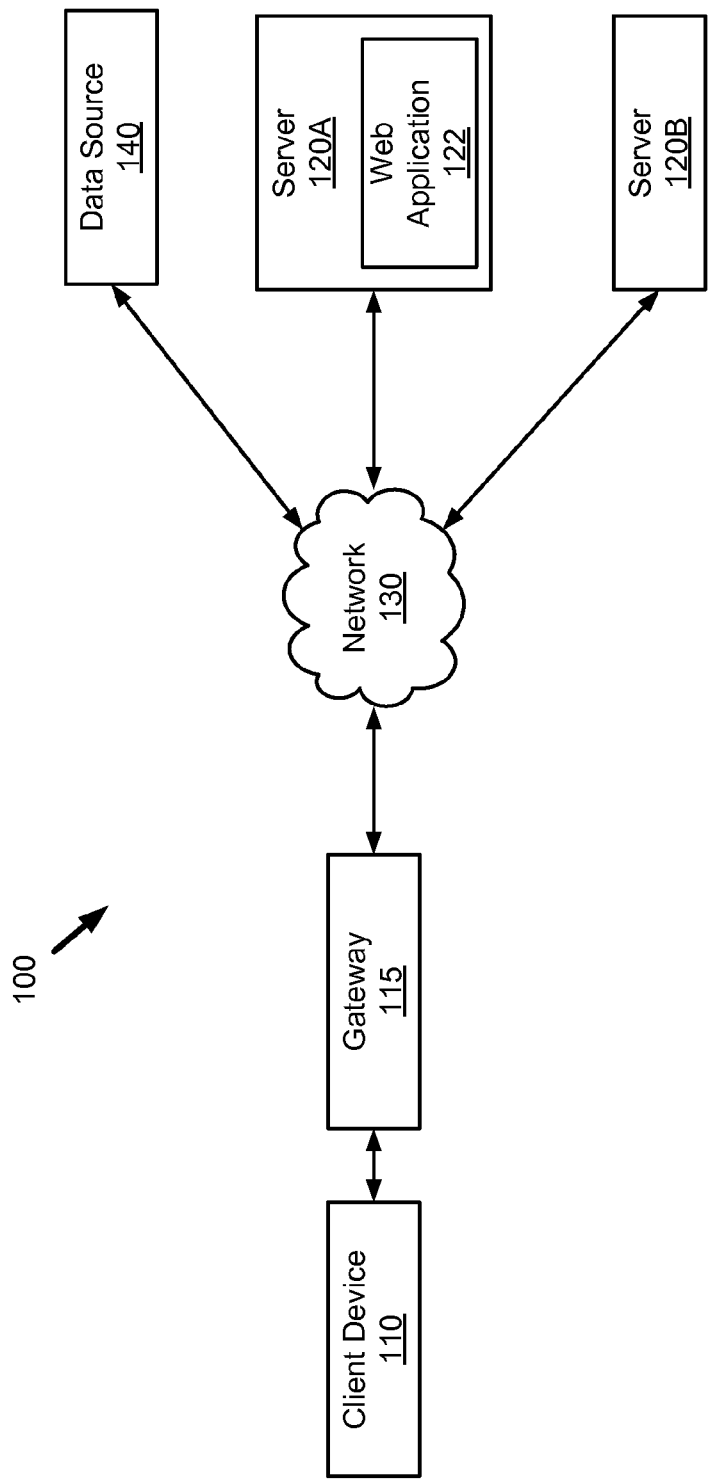
FIG. 1 is a block diagram of a system for blocking transmission of sensitive information using dynamic data tainting according to one embodiment.

A method and system for blocking transmission of tainted data using dynamic data tainting in accordance with the present invention is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 is a diagram of a system 100 for blocking transmission of tainted data using dynamic data tainting. In the embodiment of FIG. 1, the system 100 includes a client device 110, a first server 120A, a second server 120B and a data source 140 exchanging data with each other via a network 130. Additionally, in the embodiment shown by FIG. 1, the client device 110 is coupled to a gateway 115, which is coupled to the network 130. In other embodiments the system 100 includes additional and/or different components than the ones shown in FIG. 1.

The client device 110 is a computing device having data processing and communication capabilities. For example, a client device 110 comprises a desktop computer, a laptop computer, a netbook computer, a tablet computer, a smartphone or an internet capable television. While the system 100 shown by FIG. 1 includes a single client device 110, in other embodiments, the system 100 includes multiple client devices 110. For example, different types of client devices 110 are included in the system 100, such as a smartphone, a tablet computer and/or a laptop computer.

The client device 110 executes instructions or data using a processor to store, retrieve, modify or otherwise access data. When executing one or more processes, the client device 110 may access data from a remote source, such as a server 120 or another data source 140 via the network 130. To access remote data, the client device 110 transmits a data request to the server 120 or data source 140 via the network 130. The data request identifies the requested data as well as the client device 110 and may include additional information for identifying and retrieving the data.

A gateway 115 is coupled to the client device 110 and to the network 130 and receives one or more data requests from the client device 110. The gateway 115 communicates the data request to a server 120A, 120B or a data source 140 via the network 130 and receives data from one or more of the first server 120A, the second server 120B and the data source 140 via the network 130. The gateway 115 is a computing device that couples one or more client devices 110 to a network 130. For example, the gateway 115 is a router, a wireless access point, a network switch or any other suitable type of computing device. While FIG. 1 shows the gateway 115 as a separate component, in some embodiments the gateway 115 is included in the client device 110.

In addition to communicating data requests and data between a client device 110 and the first server 120A, the second server 120B and the data source 140, the gateway 115 also identifies and blocks attempts by computer code received from a non-trusted entity to communicate sensitive information from a client device 110 to a non-trusted entity. For example, one or more of the data source 140, the first server 120A and the second server 120B are non-trusted entities. The gateway 115 receives computer code from one or more of the data source 140, the first server 120A and the second server 120B. In one embodiment, the computer code is any routine and/or script received from the web application 122 and/or the data source 140. For example, the computer code is a client-side script. The gateway 115 executes the computer code. As described in more detail below, in one embodiment the gateway 115 executes the computer code in a sandbox to protect the resources of the gateway 115 and/or the client device 110. The gateway 115 tracks the execution of the computer code. If the computer code attempts to access sensitive information stored on the client device 110 and/or the gateway 115 and transmit the sensitive information to a non-trusted entity (i.e., one or more of the data source 140, the first server 120A and the second server 120B), the gateway 115 blocks the transmission of the sensitive information.

For example, sensitive information is initially tainted by either the gateway 115 or the client device 110. Tainting means that the data is marked so that it can be tracked (e.g., a bit in the data is modified to indicate that the data is tainted). Described at a high level, the gateway 115 receives computer code from a non-trusted entity. The gateway 115 executes the computer code received from the non-trusted entity and analyzes the source of data requested by the executed computer code to determine if executed computer code is requesting tainted data (i.e., sensitive information). The gateway 115 tracks whether the executed computer code attempts to transmit the tainted data to an external party such as the data source 140 and a server 120A, 120B (other external parties are possible).

In one embodiment, the gateway 115 sandboxes the computer code. For example, the gateway 115 generates a virtual container and stores the computer code in the virtual container prior to executing the computer code. The virtual container is configured to protect resources of the client device 110 and/or the gateway 115. The gateway 115 executes the computer code in the virtual container and determines whether the computer code is requesting tainted data. The gateway 115 tracks whether the computer code attempts to transmit the tainted data to an external party such as the data source 140 and a server 120A, 120B. Sandboxing is a computer security mechanism for separating running programs and is used to execute untested (or non-trusted) computer code in a safe computing environment. The sensitive information is described in more detail with reference to FIG. 3. Dynamic data tainting is described in more detail with reference to FIGS. 4-6, 7A and 7B.

In one embodiment, the server 120A comprises a web application 122. The web application 122 is code and routines that, when executed by a computer processor of the server 120A (the processor is not pictured), causes the web application 122 to transmit compute code to the client device 110. The computer code is intercepted by the gateway 115. The gateway 115 performs steps described below with reference to FIGS. 6, 7A and 7B to determine whether the computer code is exhibiting behavior indicating that the computer code is malicious. For example, the computer code may exhibit behavior indicative of a cross-site scripting attack. Such behavior includes, among other things, attempting to access sensitive information and attempting to transmit the sensitive information (or a derivative thereof) to the data source 140 and a server 120A, 120B. The gateway 115 detects this behavior using dynamic data tainting and takes steps to block the transmission of the sensitive information to the data source 140 and a server 120A, 120B. Dynamic data tainting is described below with reference to FIGS. 2-8.

The network 130 is a conventional network and may have any number of configurations such as a star configuration, a token ring configuration or another configuration known to those skilled in the art. In various embodiments, the network 130 is a wireless network, a wired network or a combination of a wireless and a wired network. Furthermore, the network 130 may be a local area network (LAN), a wide area network (WAN) (e.g., the Internet) and/or any other interconnected data path across which multiple devices may communicate. In yet another embodiment, the network 130 may be a peer-to-peer network.

The network 130 may also be coupled to, or include, portions of a telecommunications network for communicating data using a variety of different communication protocols. In yet another embodiment, the network 130 includes a Bluetooth communication network and/or a cellular communications network for sending and receiving data (e.g., 3G and/or 4G network). For example, the network 130 transmits and/or receives data using one or more communication protocols such as short messaging service (SMS), multimedia messaging service (MMS), hypertext transfer protocol (HTTP), direct data connection, WAP, email or another suitable communication protocol.

A server 120 or a data source 140 is a computing device including data processing and communication capabilities. For purposes of illustration, FIG. 1 illustrates a system 100 including a first server 120A and a second server 120B; however, in other embodiments, the system 100 includes any number of servers 120. For example, a server 120 includes a processor, a communication unit and a storage device. However, in other embodiments, a server 120 may include different and/or additional components. A server 120 receives a data request from a client device 110 and transmits data to the client device 110 via the network 130. In one embodiment, a server 120 generates data or modifies data responsive to the data request. Different processes executed by the client device 110 may generate data requests for different servers 120. For example, a first process executed by the client device 110 generates a data request that is communicated to a first server 120A, while a second process executed by the client device 110 generates a data request that is communicated to a second server 120B.

Client Device 110

Figure 2:
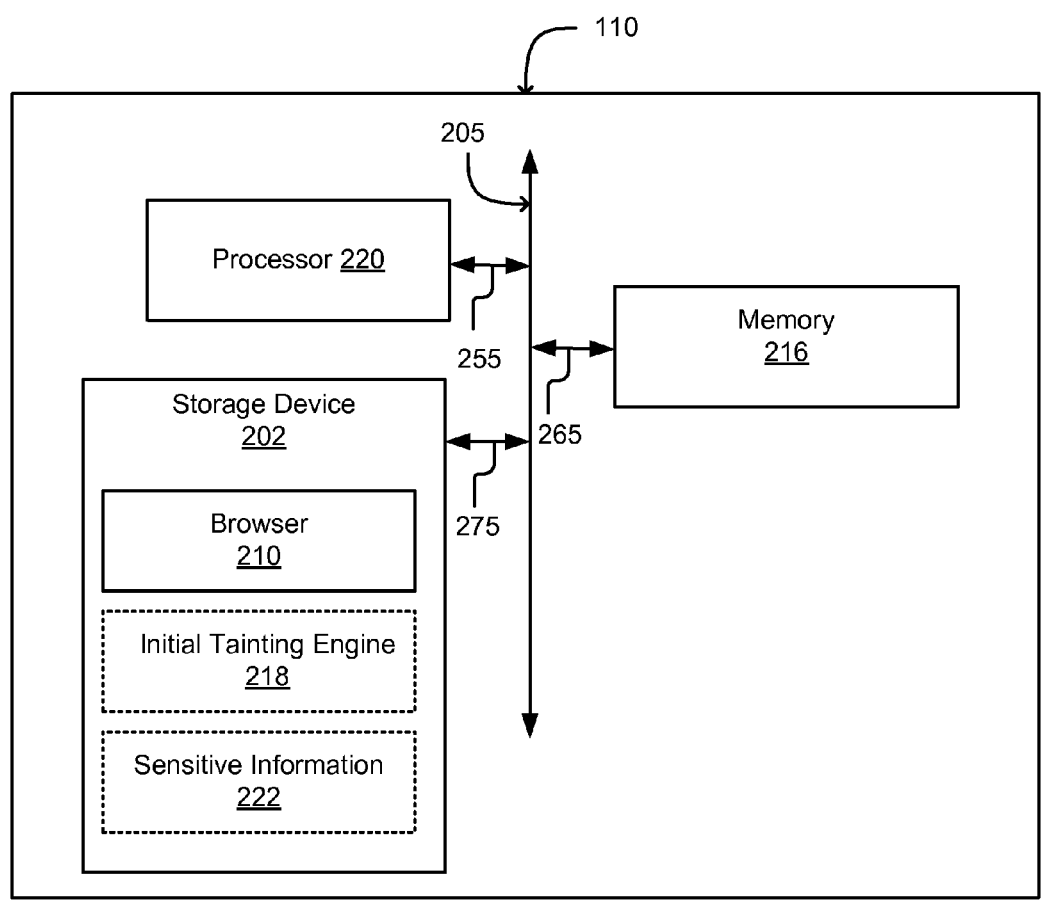
FIG. 2 is a block diagram of a client device according to one embodiment.

FIG. 2 is a block diagram of a client device 110. The client device 110 comprises a processor 220, a memory 216, a storage device 202 (sometimes referred to herein as "storage 202") and a browser 210 stored on the storage device 202. In one embodiment, the client device 110 additionally includes an initial tainting engine 218 and/or sensitive information 222 stored on the storage device 202. The initial tainting engine 218 and the sensitive information 222 are each depicted in FIG. 2 using a box formed by a dotted line to indicate that they are optional features of the client device 110. In other embodiments, one or more of the initial tainting engine 218 and the sensitive information are included in the gateway 115.

The processor 220, memory 216, storage device 202, browser 210, initial tainting engine 218 and sensitive information 222 are communicatively coupled to one another via a bus 205. The processor 220 is communicatively coupled to the bus 205 via signal line 255. The memory 216 is communicatively coupled to the bus 205 via signal line 265. The storage device 202 is communicatively coupled to the bus 205 via signal line 275. The browser 210 and/or the initial tainting engine 218 communicate with the other elements of the client device 110 via the signal line 275. The sensitive information 222 is accessible via the signal line 275.

The processor 220 comprises an arithmetic logic unit, a microprocessor, a general purpose controller or some other processor array to perform computations and provide electronic display signals to a display device. The processor 220 is coupled to the bus 205 for communication with the other components. Processor 220 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 216 stores instructions and/or data that may be executed by processor 220. The memory 216 is coupled to the bus 205 for communication with the other components. The instructions and/or data may comprise code for performing any and/or all of the techniques described herein. The memory 216 may be a dynamic random access memory (DRAM) device, a static random access memory (SRAM) device, flash memory or some other memory device known in the art. In one embodiment, the memory 216 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage device 202 is a non-transitory computer-readable memory configured to store computer code. For example, the storage device 202 is a non-volatile storage medium such as a hard drive, flash memory, etc. The storage device 202 stores one or more of the browser 210, the initial tainting engine 218 and the sensitive information 222. The processor 220 accesses and executes the elements stored on the storage device 202.

The browser 210 is a web browser stored on the on the storage device 202 and configured for two-way communication with the gateway 115. For example, the browser 210 is a software application such as Mozilla FireFox, Windows Internet Explorer, Google Chrome, Apple Safari, Opera, etc. In one embodiment, the browser 210 communicates with the network 130 via the gateway 115.

The initial tainting engine 218 is code and routines executable by the processor 220 and configured to taint the sensitive information 222 responsive to being executed by the processor 220. For example, the initial tainting engine 218 analyzes the data stored on the client device 110 and/or the gateway 115. The initial tainting engine 218 determines that a portion of the data is sensitive information 222 based on whether the data is of a type described below with reference to FIG. 3. If the data is of a type described below with reference to FIG. 3, the initial tainting engine 218 marks the data as being sensitive. For example, the data stored on the client device 110 and/or the gateway 115 carries a taint bit indicating whether the data is tainted or not. If the initial tainting engine 218 determines that a piece of data is sensitive, and should therefore be tainted, the initial tainting engine 218 modifies the taint bit to "1" to indicate that the data is tainted. In one embodiment, the initial tainting engine 218 modifies the taint bit to "0" to indicate that the data is tainted. The sensitive information 222 can then be tracked because the tainted bit is modified to indicate that the data is tainted.

In one embodiment, values derived from tainted data will also be tainted. If a tainted value is passed to a function, the return value of the function is tainted. For example, the return value will have a taint bit and the taint bit will indicate that the return value is tainted. In other words, values derived from tainted data elements are also tainted. If computer code received from a non-trusted entity examines a tainted value in an "if," "for," or "while" statement, the computer code itself accumulates the taint from the tainted value. If a string is tainted, any substring of that string will also be tainted. For example, if the taint bit for a string indicates that the string is tainted, any substring of that tainted string will include a taint bit modified to indicate that the substring is tainted. Accordingly, in one embodiment, sensitive information 222 can be tracked whether in its original form or in a derivative form.

In another embodiment, the initial tainting engine 218 is configured to perform the method described below with reference to FIG. 5.

The sensitive information 222 is data identified by the initial tainting engine 218 as sensitive information. The sensitive information 222 is described in more detail with reference to FIG. 3.

Sensitive Information 222

Figure 3:
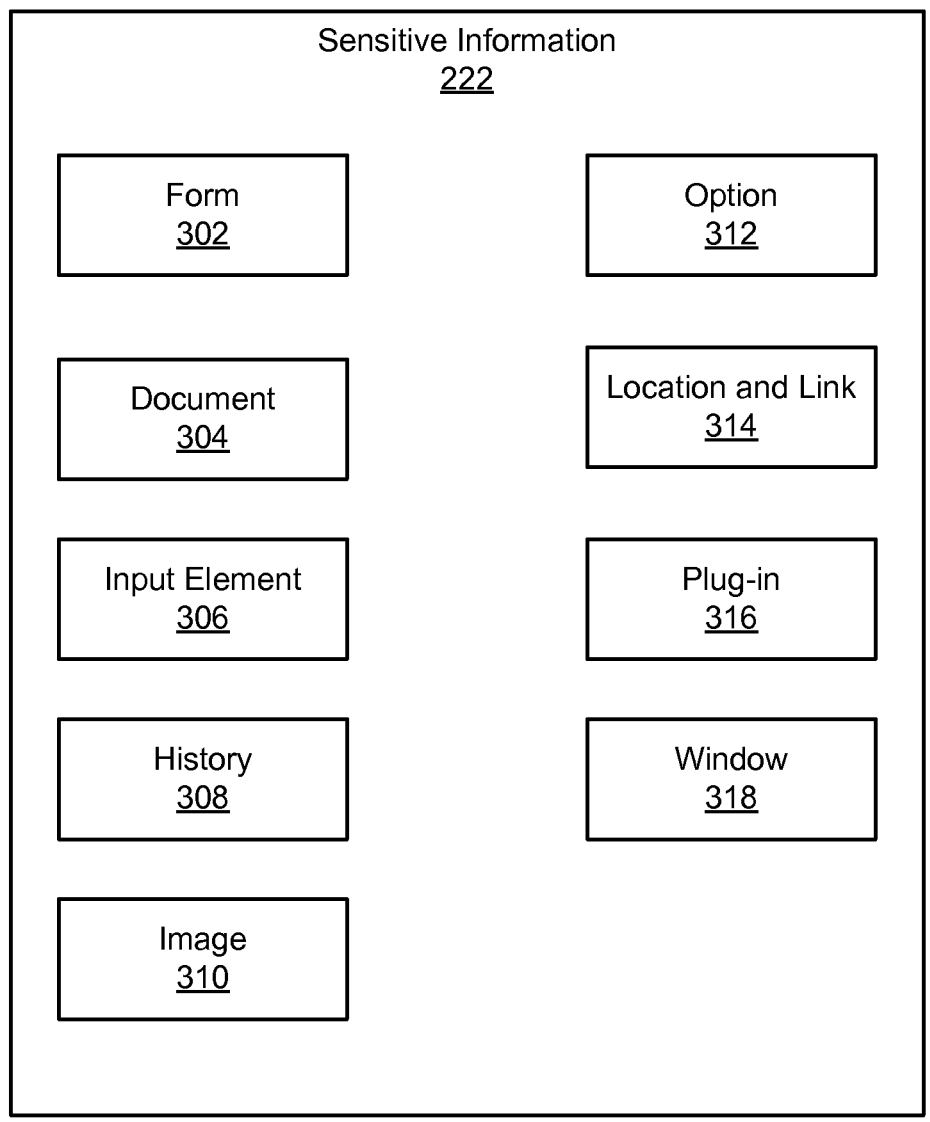
FIG. 3 is a block diagram of sensitive information according to one embodiment.

FIG. 3 is a block diagram of one embodiment of the sensitive information 222. The sensitive information 222 comprises one or more data structure objects and corresponding properties for those data structure objects that the initial tainting engine 218 taints. The data structure objects that are tainted include: a form object 302; a document object 304; an input element object 306, a history object 308; an image object 310; and option object 312; a location and/or link object 314; a plug-in object 316; and a window object 318. Each of these objects is known to persons having skill in the art. The properties tainted for these data structure objects are described below.

To track the processing of sensitive information, the concept of "dynamic data tainting" is used. For every performed instruction in the program, the results of these instructions are tainted if the used operands are tainted and it is possible to transfer information with the instruction. "Dynamic" describes that the information flow is tracked while the program is executed.

In one embodiment, when analyzing the data stored on the client device 110 and/or the gateway 115 for purposes of providing the initial tainting method described below with reference to FIG. 5, the initial tainting engine 218 taints one or more of the "action" and "name" properties for the form objects 302. Further properties that are tainted in accordance with this embodiment are now described. For document objects 304, the initial tainting engine 218 taints one or more of the "cookie," "domain," "forms," "lastModified," "links," "referrer," "title" and "URL" properties. For input element objects 306, the initial tainting engine 218 taints one or more of the "checked," "defaultChecked," "defaultValue," "name," "selectedIndex," "selected," "toString," "text" and "value" properties. For history objects 308, the initial tainting engine 218 taints one or more of the "current," "next," "previous" and "toString" properties. For image objects 310, the initial tainting engine 218 taints the "name" property. For option objects 312, the initial tainting engine 218 taints one or more of the "defaultSelected," "selected," "text" and "value" properties. For location and/or link objects 314, the initial tainting engine 218 taints one or more of the "hash,"

"host," "hostname," "href," "pathname," "port," "protocol," "search" and "toString" properties. For plug-in objects 316, the initial tainting engine 218 taints the "name" property. For window objects 318, the initial tainting engine 218 taints one or more of the "defaultStatus," "name" and "status" properties.

In other embodiments, different objects and/or different properties are tainted by the initial tainting engine 218.

Gateway 115

Figure 4:
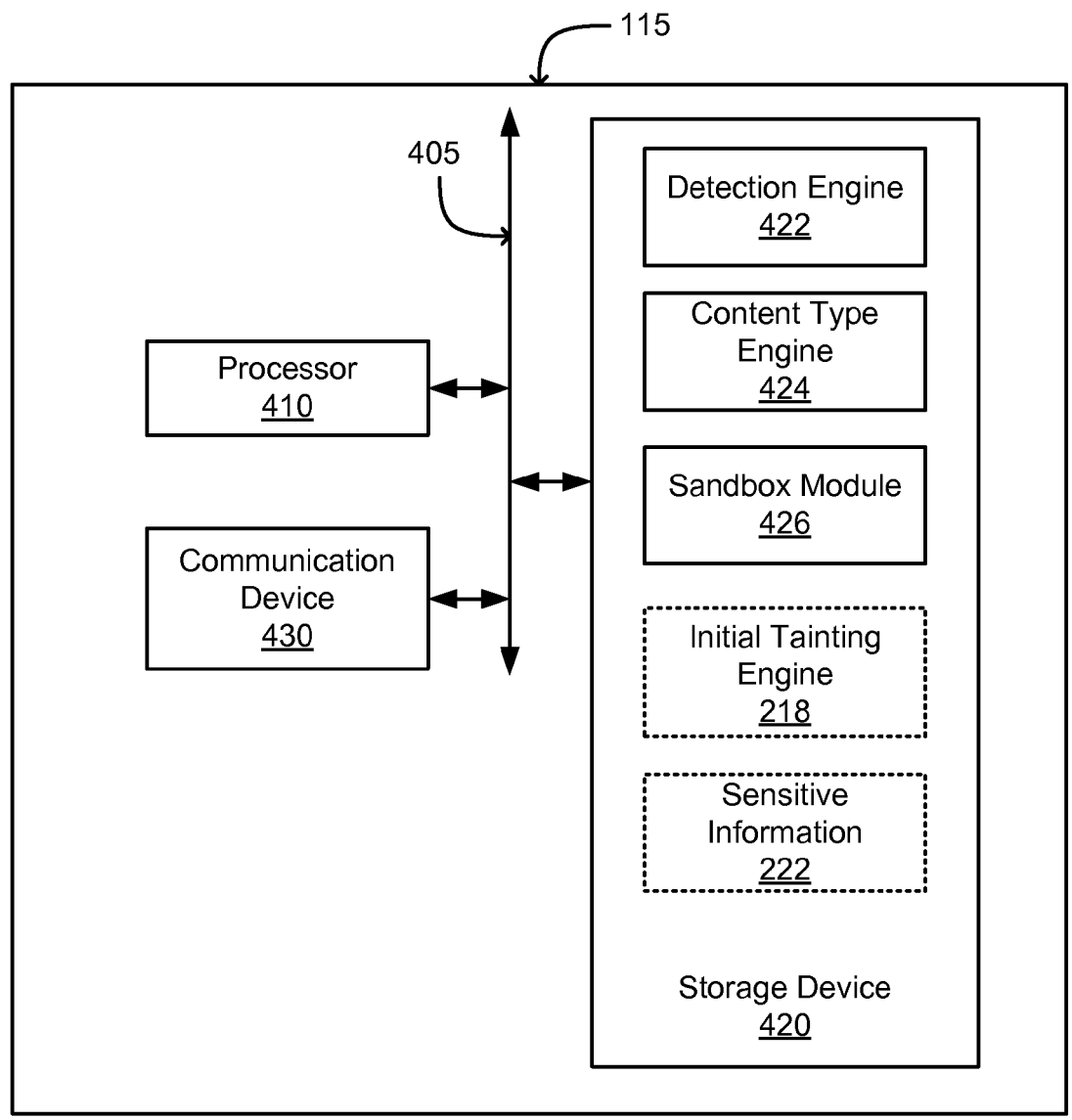
FIG. 4 is a block diagram of a gateway according to one embodiment.

FIG. 4 is a block diagram of one embodiment of a gateway 115. In the embodiment shown by FIG. 4, the gateway 115 includes a processor 410, a storage device 420 and a communication device 430 coupled to each other via a bus 405. However, in other embodiments the gateway 115 may include different and/or additional components than the ones shown by FIG. 4. In the depicted embodiment, the storage device 420 stores a detection engine 422, a content type engine 424 and a sandbox module 426. In one embodiment, the gateway 115 additionally comprises the initial tainting engine 218 and/or the sensitive information 222 stored in the storage device 420. The initial tainting engine 218 and the sensitive information 222 are each depicted in FIG. 4 using a box formed by a dotted line to indicate that they are optional features of the gateway 115. In other embodiments, one or more of the initial tainting engine 218 and the sensitive information are included in the client device 110.

The processor 410 is an arithmetic logic unit, a microprocessor, a general purpose controller or some other processor array to perform computations or other data processing that is coupled to the bus 405 for communication with the other components of the gateway 115. The processor 410 provides similar functionality as the processor 220 described above with reference to FIG. 2, so that description will not be repeated here.

The storage device 420 is a non-transitory computer-readable memory that stores instructions and/or data that may be executed by processor 410. The stored instructions and/or data may be code for performing any and/or all of the functionality described herein. For example, the storage device 420 includes instructions that, when executed by the processor 410, cause the processor 410 to execute the steps further described below in conjunction with FIGS. 5, 6, 7A and 7B. In one embodiment, the storage device 420 is a non-volatile memory device or similar persistent storage device and media. For example, the storage device 420 may be a hard disk drive, a floppy disk drive, a CD-ROM device, a DVD-ROM device, a DVD-RAM device, a DVD-RW device, a flash memory device or another mass storage device known in the art. In one embodiment, the storage device 420 comprises a dynamic random access memory (DRAM) device, a static random access memory (SRAM) device, flash memory or some other memory device known in the art. In another embodiment, the storage device 420 comprises a combination of persistent memory and non-persistent memory. The storage device 420 is coupled to the bus 405 to communicate with other components of the gateway 115.

In one embodiment, the storage device 420 includes a detection engine 422, content type engine 424, sandbox module 426, initial tainting engine 218 and sensitive information 222.

The detection engine 422 is code and routines that, when executed by the processor 410, tracks tainted data and blocks tainted data from being transmitted to one or more of the data source 140, the first server 120A and the second server 120B. The functionality of the detection engine 422 is described further with reference to FIGS. 6, 7A and 7B.

The content type engine 424 is code and routines that, when executed by the processor 410, analyzes computer code received from a web application 122 to determine whether the received computer code includes dynamic content. Dynamic content includes, for example, JavaScript, Flash Application, HyperText Markup Language ("HTML"), Visual Basic Scripting Edition ("VBScript"), Cascading Style Sheet ("CSS"), Extensible Markup Language ("XML"), Portable Document Format ("PDF") and similar content. For example, the content type engine 424 includes a parser configured to parse the computer code and determine if the computer code includes JavaScript, Flash Application, HTML, VBScript, CSS, XML and PDF grammar. If one or more of these grammars is detected, the content type engine 424 determines that the computer code includes dynamic content. If dynamic content is detected by the content type engine 424, the content type engine transmits the dynamic content to the sandbox module 426. The sandbox module 426 creates a virtual container in which the dynamic content can be safely executed to determine if it will attempt to access tainted data and transmit the tainted data to one or more of the data source 140, the first server 120A and the second server 120B. The detection engine 422 communicates with the sandbox module 426 to determine if the dynamic content will attempt to access tainted data and transmit the tainted data to one or more of the data source 140, the first server 120A and the second server 120B. Upon the processor 410 executing the dynamic content in the virtual container, the detection engine 422 tracks the routines of the dynamic content to determine if it attempts to access the tainted data. The detection engine 422 blocks any transmission of the tainted data to the data source 140, the first server 120A and the second server 120B. The functionality of the content type engine 424 is described in further detail with reference to FIGS. 7A and 7B.

The sandbox module 426 is code and routines that, when executed by the processor 410, creates a virtual container in which the dynamic code can be safely executed. In one embodiment, the sandbox module 426 is configured to provide a virtual container in a scratch space on a storage device 420. In one embodiment, the sandbox module 426 configures the virtual container so that the executed dynamic content cannot access the network 130. In another embodiment, the sandbox module 426 further configures the virtual container so that the executed dynamic content has restricted ability to access the sensitive information 222 (whether the sensitive information 222 is stored on the gateway 115 or the client device 110).

The initial tainting engine 218 and the sensitive information 222 are described above with reference to FIGS. 2 and 3, so these descriptions will not be repeated here.

The communication device 430 receives data requests from a client device 110 and transmits the data request to a server 120 or a data source 140 via the network 130. The communication device 430 also receives data from the server 120 or from the data source 140 via the network 130 and communicates the data to the client device 110. The communication device 430 is communicatively coupled to the bus 405. In one embodiment, the communication device 430 includes a port for direct physical connection to the network 130 or to another communication channel. For example, the communication device 430 includes a USB, SD, CAT-5 or similar port for wired communication with the network 130. In another embodiment, the communication device 430 includes a wireless transceiver for exchanging data with the network, or with another communication channel, using one or more wireless communication methods, such as IEEE 802.11, IEEE 802.16, BLUETOOTH® or another suitable wireless communication method.

In yet another embodiment, the communication device 430 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 430 includes a wired port and a wireless transceiver. The communication device 430 also provides other conventional connections to the network 130 for distribution of files and/or media objects using standard network protocols such as TCP/IP, HTTP, HTTPS and SMTP as will be understood to those skilled in the art.

Methods

Figure 5:
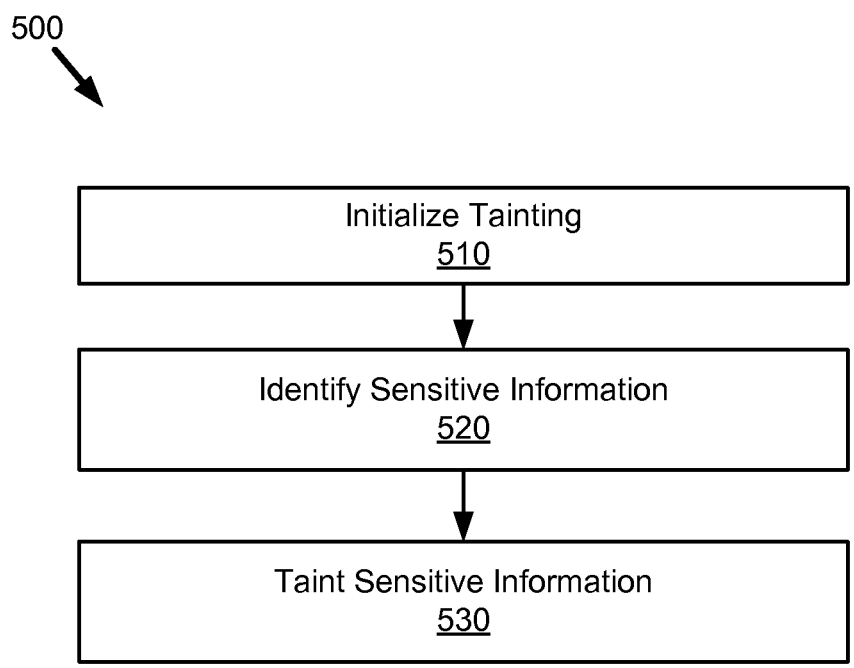
FIG. 5 is a flow chart of a method for tainting sensitive information according to one embodiment.

FIG. 5 is a flow chart of a method 500 for tainting sensitive information 222. In one embodiment, the initial tainting engine 218 initializes 510 the tainting process. The above description for FIG. 3 describes the combination of data objects and parameters that are tainted by the initial tainting engine 218. These combinations of data objects and parameters are described above as the sensitive information 222. The initial tainting engine 218 analyzes data stored on the client device 110 and/or the gateway 115 to identify 520 whether any of these combinations of data objects and parameters are present. If present, the initial tainting engine 218 taints 530 the data. For example, the initial tainting engine 218 modifies the taint bit to indicate that the data is tainted.

Figure 6:
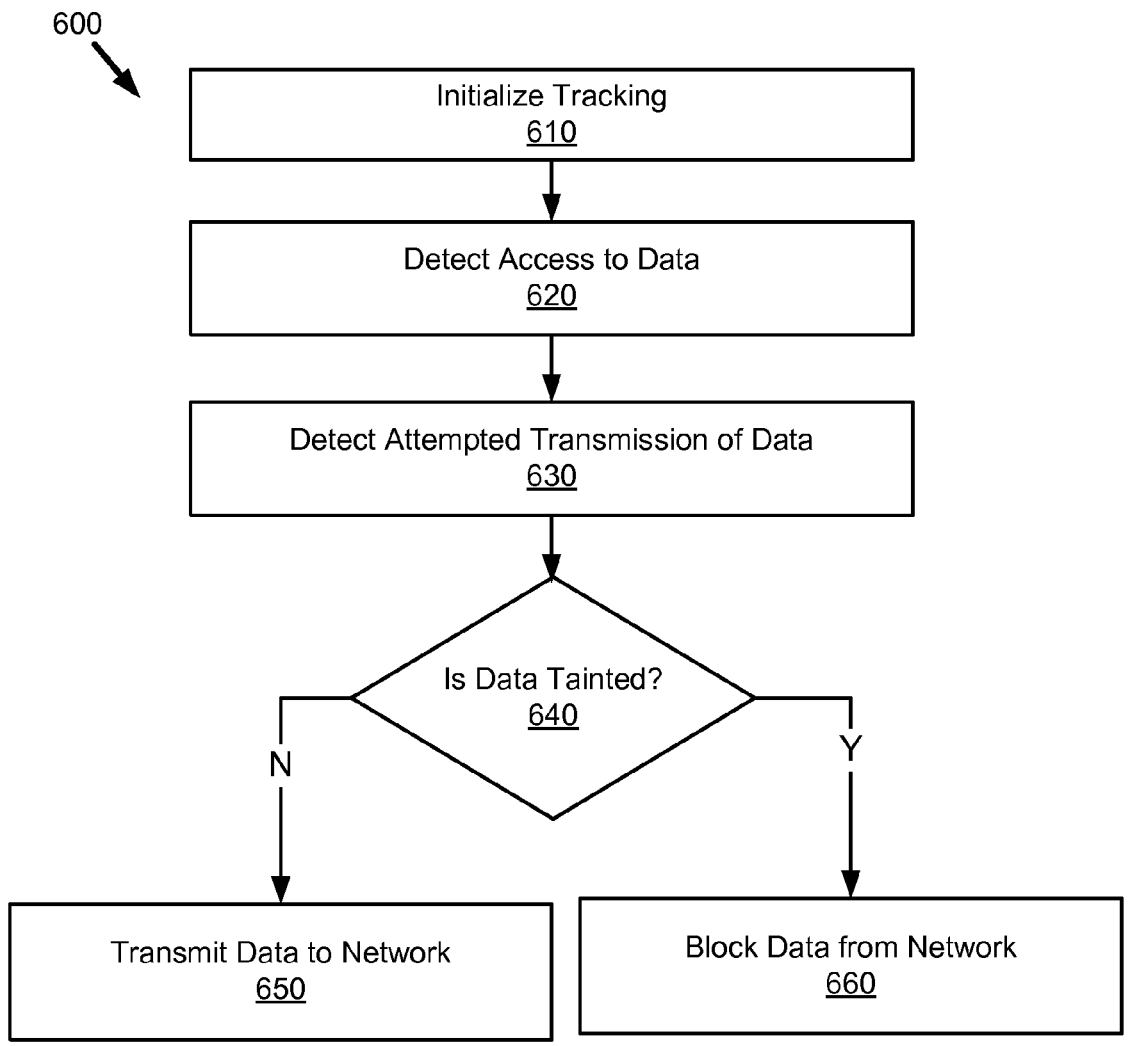
FIG. 6 is a flow chart of a method for blocking transmission of tainted data using dynamic data tainting according to one embodiment.

FIG. 6 is a flow chart of a method 600 for blocking transmission of tainted data using dynamic data tainting. The detection engine 422 initializes 610 tracking of the tainted data. The detection engine 422 detects 620 a computer code attempt to access data stored on one or more of the client devices 110 and the gateway 115. In one embodiment, the computer code is any routine and/or script received from the web application 122 and/or the data source 140. The detection engine 422 detects 630 the computer code attempt to transmit the data to one or more of the data source 140, the first server 120A and the second server 120B. The detection engine 422 analyzes the data to determine 640 if data is tainted. If the data is not tainted, the detection engine 422 permits the gateway 115 to transmit 650 the data to the network 130. If the data is tainted, the detection engine 422 blocks 660 the tainted data from being transmitted to the network 130. In one embodiment, the detection engine 422 determines the computer code to be malicious if the computer code accesses tainted data and attempts to transmit the tainted data to one or more of the data source 140, the first server 120A and the second server 120B.

Figure 7A:
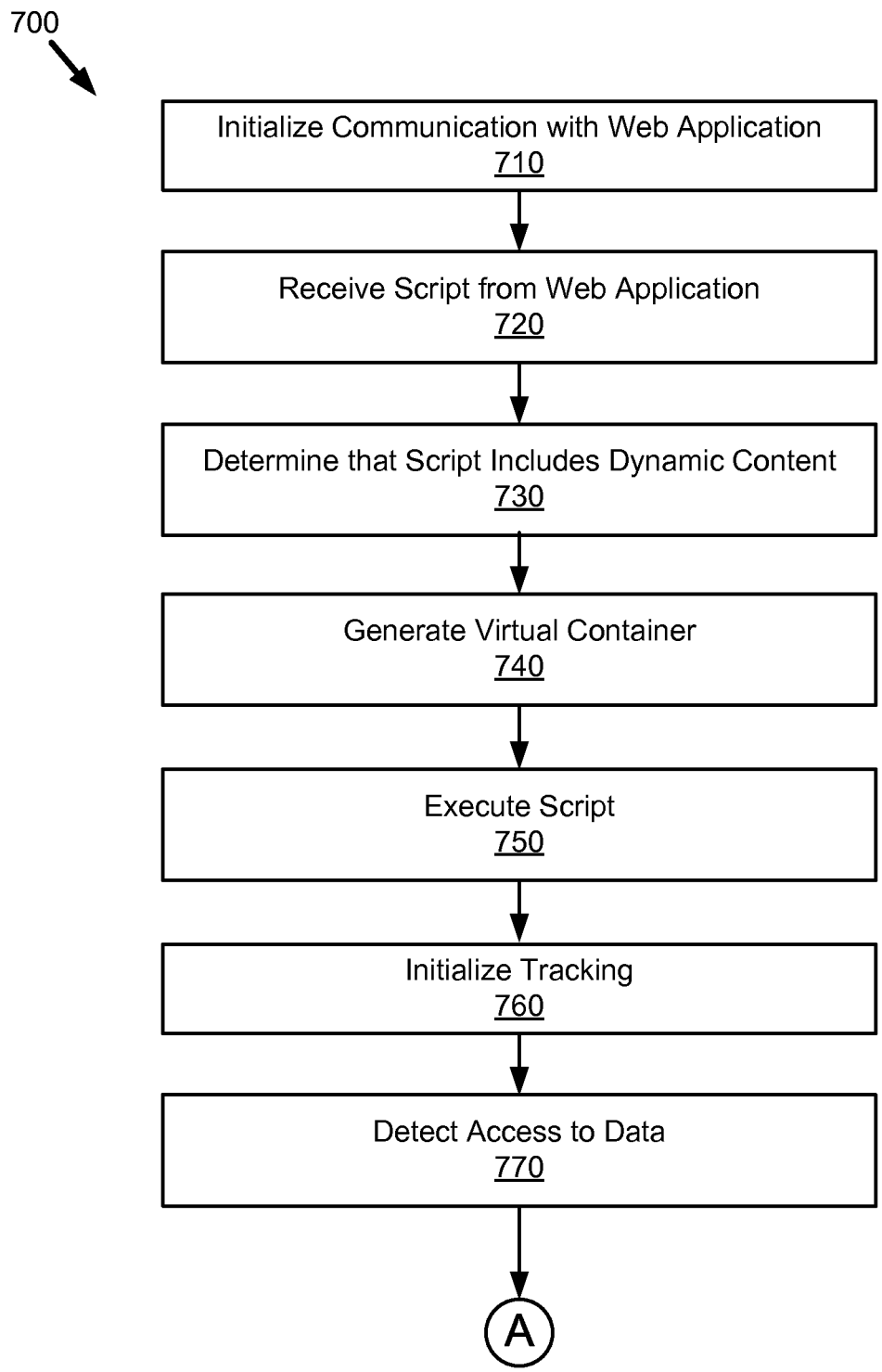
FIGS. 7A and 7B are a flow chart of a method for blocking malicious transmission of tainted data using dynamic data tainting according to another embodiment.
Figure 7B:
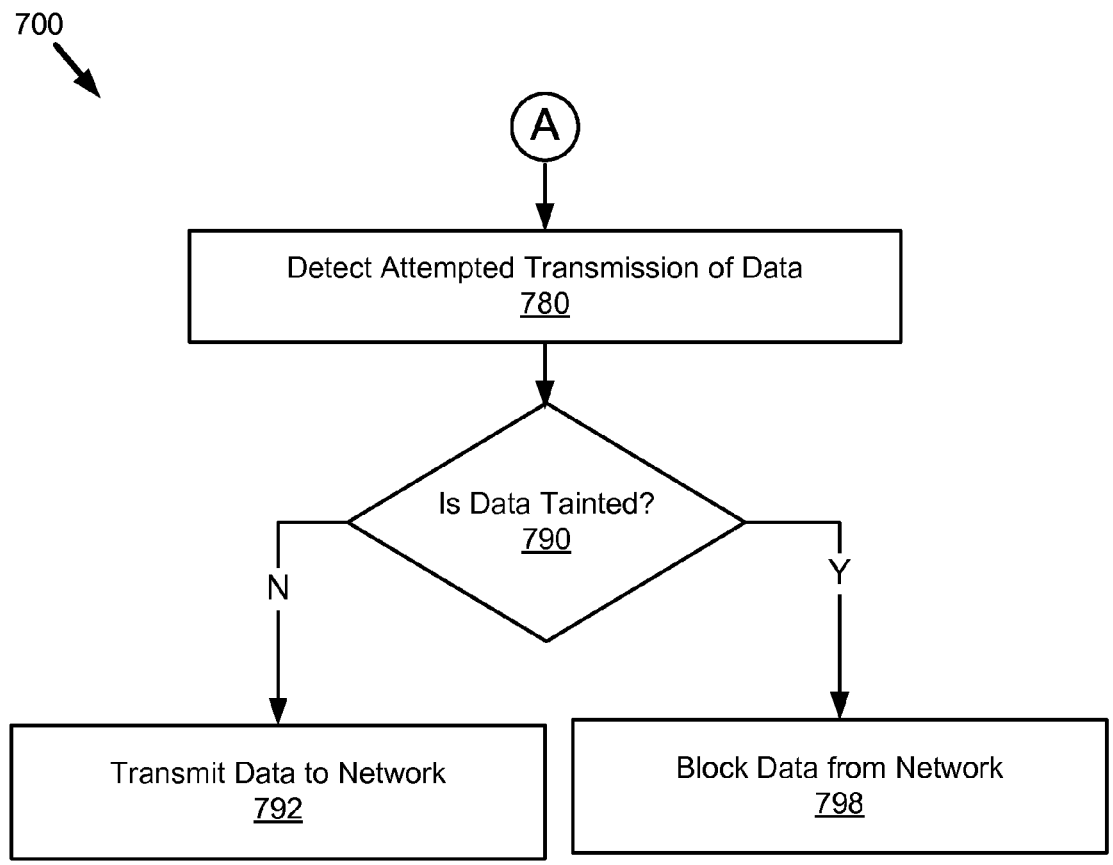

FIGS. 7A and 7B are a flow chart of a method 700 for blocking transmission of tainted data using dynamic data tainting according to another embodiment. The gateway 115 initializes 710 communication with the web application 122. The gateway 115 receives 720 computer code from the web application 122. The content type engine 424 analyzes the computer code and determines 730 that the computer code includes dynamic content. The content type engine 424 communicates with the sandbox module 426 to send the computer code to the sandbox module 426 and indicates that the computer code includes dynamic content. The sandbox module 426 generates 740 a virtual container for the script. The sandbox module 426 stores the computer code in the virtual container. In one embodiment, the virtual container is a portion of the storage device 420.

The processor 410 executes 750 the script. The detection engine 422 initializes 760 tracking of the tainted data. The detection engine 422 detects 770 the computer code attempt to access data stored on one or more of the client device 110 and the gateway 115. The detection engine 422 detects 780 the computer code attempt to transmit the data to one or more of the data source 140, the first server 120A and the second server 120B. The detection engine 422 analyzes the data to determine 790 if data is tainted. If the data is not tainted, the detection engine 422 permits the gateway 115 to transmit 792 the data to the network 130. If the data is tainted, the detection engine 422 blocks 798 the tainted data from being transmitted to the network 130. In one embodiment, the detection engine 422 determines the computer code to be malicious if the computer code accesses tainted data and attempts to transmit the tainted data to one or more of the data source 140, the first server 120A and the second server 120B.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method comprising:
   in response to determining that a data structure object is a first type, tainting the data structure object by modifying a taint bit of a property field of the data structure object, the data structure object included in first data;
   tracking, at a gateway device, execution of computer code received from a non-trusted entity via a network, the computer code received by the gateway when sent by the non-trusted entity to a client device in response to a request from the client device, the tracking including identifying that the computer code performs an operation on the tainted first data;

when the operation on the tainted first data results in second data, tainting the second data;

detecting that the computer code attempts a network transmission to the non-trusted entity; and when the attempted network transmission includes at least one of the tainted first data or the tainted second data, blocking transmission of the at least one of the tainted first data or the tainted second data.

2. The computer-implemented method of claim 1, further including:

generating a virtual container; and storing the computer code in the virtual container prior to execution of the computer code, the execution of the computer code and the tracking of the executed computer code occurring while the computer code is stored in the virtual container.

3. The computer-implemented method of claim 2, further including:

determining whether the computer code includes dynamic content; and storing the computer code in the virtual container when the computer code includes the dynamic content.

4. The computer-implemented method of claim 3, wherein the dynamic content includes at least one of JavaScript, Flash Application, HyperText Markup Language, Visual Basic Scripting Edition, Cascading Style Sheet, Extensible Markup Language, or Portable Document Format.

5. The computer-implemented method of claim 2, wherein the virtual container blocks the computer code from accessing the network.

6. The computer-implemented method of claim 1 further including, analyzing a source of data requested by the computer code.

7. A tangible computer readable storage device or storage disc comprising instructions that, when executed, cause a gateway to at least:

in response to determining that a data structure object is a first type, taint the data structure object by modifying a taint bit of a property field of the data structure object, the data structure object included in first data track execution of computer code received from a non-trusted entity via a network, the computer code sent by the non-trusted entity in response to a request from a client device, to track the execution of the computer code, the instructions cause the gateway to identify that the computer code performs an operation on the tainted first data;

when the operation on the tainted first data results in second data, taint the second data;

detect that the computer code attempts a network transmission to the non-trusted entity; and when the attempted network transmission includes at least one of the tainted first data or the tainted second data, block transmission of the at least one of the tainted first data or the tainted second data.

8. The tangible computer readable storage device or storage disc of claim 7, wherein the instructions further cause the gateway to:

generate a virtual container; and store the computer code in the virtual container prior to execution of the computer code, the execution of the computer code and the tracking of the executed computer code occurring while the computer code is stored in the virtual container.

9. The tangible computer readable storage device or storage disc of claim 8, wherein the instructions further cause the gateway to:

determine whether the computer code includes dynamic content; and store the computer code in the virtual container when that the computer code includes the dynamic content.

10. A gateway comprising:

an initial tainting engine to, in response to determining that a data structure object is a first type, taint the data structure object by modifying a taint bit of a property field of the data structure object, the data structure object included in first data;

a content type engine to analyze computer code received from a web application, wherein the property field of the data structure object has been modified by the tainting engine prior to the content type engine analyzing the computer code;

a sandbox module to execute the received computer code; and a detection engine to:

identify that the computer code performs an operation on the tainted first data;

when the operation on the tainted first data results in second data, taint the second data;

detect that the computer code attempts a network transmission to a non-trusted entity; and when the attempted network transmission includes at least one of the tainted first data or the tainted second data, block transmission of the at least one of the tainted first data or the tainted second data.

11. The gateway of claim 10, wherein the sandbox module is to generate a virtual container and store the computer code in the virtual container prior to executing the computer code, the sandbox module to execute the computer code in the virtual container and the detection engine to detect the the attempted network transmission while the computer code is in the virtual container.

12. The gateway of claim 11, wherein the content type engine is to determine whether the computer code includes dynamic content and the sandbox module is to store the computer code in the virtual container if the computer code includes dynamic content.

13. The gateway of claim 12, wherein the dynamic content includes at least one of JavaScript, Flash Application, HyperText Markup Language, Visual Basic Scripting Edition, Cascading Style Sheet, Extensible Markup Language, or Portable Document Format.

14. The gateway of claim 11, wherein the virtual container is to block the computer code from accessing a network.

15. The computer-implemented method of claim 1, wherein the first type is at least one of a form object, a document object, an input element object, a history object, an image object, and option object, a location object, a link object, a plug-in object, or a window object.

16. The computer-implemented method of claim 1, further including, when the attempted network transmission includes the at least one of the first data or the second data, determining the computer code is malicious.

17. The tangible computer readable storage device or storage disc of claim 7, wherein the first type is at least one of a form object, a document object, an input element object, a history object, an image object, and option object, a location object, a link object, a plug-in object, or a window object.

18. The tangible computer readable storage device or storage disc of claim 7, wherein the instructions further cause the gateway to determine that the computer code is malicious when the attempted network transmission includes the at least one of the first data or the second data.

19. The gateway of claim 10, wherein the first type is at least one of a form object, a document object, an input element object, a history object, an image object, and option object, a location object, a link object, a plug-in object, or a window object.

20. The gateway of claim 10, wherein the detection engine is to determine that the computer code is malicious when the attempted network transmission includes the at least one of the first data or the second data.

* * * * *